May 15, 1928.
J. W. SMITH
EYE TESTING DEVICE
Filed March 16, 1925
1,669,916
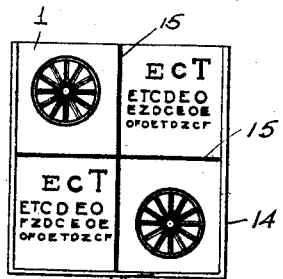
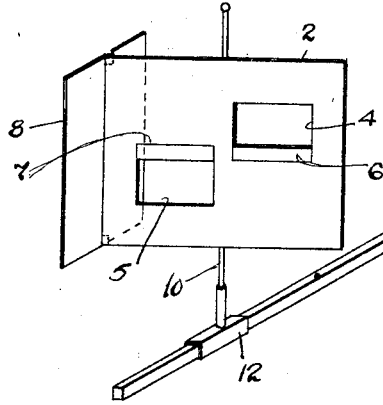
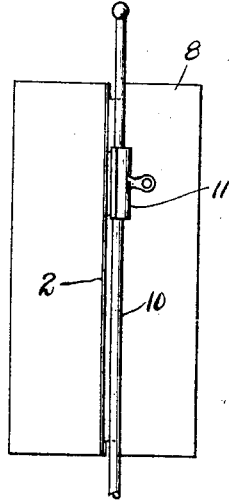
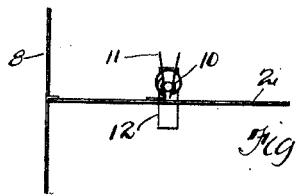
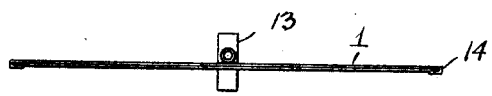
INVENTOR.
Joseph W. Smith
BY
Fay, Oberlin & Fay
ATTORNEYS.

Patented May 15, 1928.  1,669,916

UNITED STATES PATENT OFFICE.

JOSEPH W. SMITH, OF CAMBRIDGE, OHIO.

EYE-TESTING DEVICE.

Application filed March 16, 1925. Serial No. 16,000.

The present invention relates to a method of and apparatus for the testing of eyesight and more particularly to an apparatus suitable for detecting the state of the external ocular muscles and for determining the amount of the insufficiencies thereof. It is also adapted for determining and measuring ametropia binocularly. The present device is adapted to allow both eyes to be refracted at the same time and also enables the operator to keep the state of particular ocular muscles under observation throughout the entire test with lenses and prisms.

Briefly stated, the present improved device is designed to test the eyes of a patient by wholly retaining singleness of the test object, or chart, and in contradistinction to the usual type of tests, it preserves the similarity of the test image in either or both eyes. The principle of the present invention, so far as it relates to the testing of muscular imbalance, is to present a separate image from each eye which may be carried along the nerve fibers to the brain so that when united, a single image will be presented if the eyes are orthophoric; whereas, in case the eyes are not in normal balance, the two images from the two eyes will not make a single image in the brain and the amount of such imbalance can readily be determined, as well as whether the imbalance be vertical or horizontal.

To the accomplishment of the foregoing and related ends, the invention then consists of the steps and means hereinafter fully described and particularly set forth in the claims, the annexed drawing and the following description set forth in detail certain means and one mode of carrying out the invention, such disclosed means and mode illustrating, however, but one of various ways in which the principle of the invention may be used.

In said annexed drawing:—

Fig. 1 is a perspective view of a testing apparatus embodying my present improvements, said device being shown as mounted in connection with the necessary chart; Fig. 2 is a side elevation of one portion of the apparatus; Fig. 3 is a top plan view of the same; and Fig. 4 is a top plan view of the test chart proper and of the holder therefor.

As indicated by the foregoing figures, the apparatus itself principally consists of a test chart 1, which may be of any suitable construction, and an apertured plate or sheet 2 which is used before the eyes of the person being tested, the device being so arranged that it can readily be attached to any phorooptometer or other similar device.

In the illustrated form of the apparatus, a bar or rod 3 is provided on which such chart 1 and plate 2 can be adjustably mounted in a manner similar to the usual testing apparatus. It will, however, be noted that the plate or card 2 is provided with two rectangular holes 4 and 5, as best shown in Fig. 1, each of which is approximately 31 by 62 millimeters in size and symmetrically spaced on opposite sides of a vertical center line between the two and also on opposite sides of a horizontal line therebetween. In other words, if the plate is considered a rectangle divided into quarters by a horizontal and a vertical center line, the two rectangular openings will be located in diagonally opposite quarters of the card. While such openings lie close to the center lines, they do not quite touch the same; the inner vertical edge of each opening being spaced approximately 8 millimeters from the vertical center line and the horizontal edges of the openings being spaced approximately the same distance above and below the horizontal center line.

The plate through which the openings are cut may be of any color, but is preferably made a dead black and below the rectangular opening 4 in the upper right hand quarter of the plate is a white portion or area 6, which is as wide as the opening and extends downwardly to a line passing through the upper edge of the other opening. Similarly, there is a white area 7 above the opening in the lower left hand quarter of the plate of the same size, that is, of a width equal to the opening and of a height to align with corresponding area 6 adjacent the lower edge of the other opening.

To one edge of plate 2 (the left as shown in Fig. 1) is attached a second smaller rectangular plate 8 of solid opaque material, such plate 8 being preferably enameled or colored white on one side and being used to determine whether hyperphoria is present. While it is not essential that the smaller plate be thus attached to the larger (for they can be used separately), it is more convenient to use the same when mounted permanently together. For the same reason, the larger plate is adjustably mounted for height along a vertical rod 10 by means of a clip 11 which is attached to the plate and which encircles the rod so as to hold the plate in any desired adjustable position, said rod 10 being provided at its lower end with a supporting member 12 which is in turn slidably mounted upon the horizontal bar 3.

A second supporting member 13, also slidably mounted on said horizontal bar carries a frame 14 in which the test chart 1 may be removably mounted. This test chart is divided up into quarters, the diagonally opposite quarters containing the same test characters. Preferably the quarters into which the chart is thus divided are marked off by two fairly broad black lines 15, that cross each other at right angles as best shown on Fig. 1. These lines serve to carry out the testing for both lateral and vertical imbalance as will be more fully described hereinafter.

In use, the test plate 2 is set in front of the patient's eyes so that the right eye looks through the rectangular opening 4 in the upper right hand quarter of the plate and the left eye through the corresponding opening 5 in the lower left hand corner, and the test chart 1 is set on the bar 3 at a suitable distance from the plate so that the patient sees with each eye one half of the whole chart. Thus the right eye sees the upper test types and astigmatic wheel or dial, while the left eye views the lower test types and the lower wheel or dial. As a result, when the patient is asked to report the readability of the upper types, he imagines he is seeing them with both eyes and hence puts forth a normal nervational effort and this same effect is also present when he is asked to read the lower types. This means that both eyes are virtually examined at once, for the patient can look from one chart to the other and give a comparative report as to their distinctness.

The rectangular openings 4 and 5 in plate 2 are so arranged that the upper half of the object or test chart is presented to the lower half of the macula lutea of the right eye and the lower half of the object or test chart is presented to the upper half of the macula lutea of the left eye, and thus, since each eye sees only half of the chart, the sight center of the brain will unite the two portions from the two eyes and a single image will be the impression obtained, provided the eyes are orthophoric, i. e. in normal balance. In case the eyes are not orthophoric, the upper half image will appear to the right of the lower half image in a case of esophoria, and the upper half of the image will appear to the left of the lower half of the image in a case of exophoria. The rule also holds good in cases of hyperphoria or vertical imbalance. In such cases, the left half of the object is presented to the right side of the macula of the right eye and the right half of the object is presented to the left half of the macula of the left eye, so that if no vertical imbalance exists, the two halves of the object will be presented to the sight centers as one single image of the test chart. However, if right hyperphoria exists, the half image of the right eye will appear to the right side, but lower than the half image on the left, and in the case of left hyperphoria, the image of the left eye will appear on the left side but lower down than the image on the opposite side. When the patient's eyes have been tested in this manner and it has been determined that any of the muscular imbalances are present, that is, either esophoria or exophoria, or right or left hyperphoria, then the usual prism methods of correction for these defects may be employed.

In a case of cyclophoria, the black lines of the chart will not appear as exact vertical or horizontal lines during the test, but will appear at angles to each other. The angled line will represent the eye afflicted with this particular ailment; or if both eyes are thus afflicted both of the black lines of the chart will appear distorted from normal.

Previous types of muscle tests for eyes have depended wholly upon the unnatural straining of the functional powers of the extrinsic muscles of the eyes and such tests are substantially intolerable if continued for any length of time and instead of allaying disturbances, really accentuate them and to this extent it may be said that their use is faulty and objectionable because they measure not what the eyes will do if allowed to seek a position of physiological rest but what they are doing under the stress of malfunctioning muscles. The present device instead of producing diplopia or double images, wholly retains the singleness of the test object and the use of the present device does not tire the eyes or accentuate the malfunctioning of the muscles but actually rests them. This is because the entity of the test chart or object is not interfered with and the involuntary faculties of binocular vision are not disturbed.

As a matter of fact, the device can be left before the eyes indefinitely without exciting the most sensitive person to request its removal; and it is best to allow it to remain throughout a complete examination because the preliminary reading may be but the manifestation of a pseudo defect, while the last reading, after due rest has been allowed, is the true representation of the real defect. For example, exophoria that is due to overstimulation of the sixth nerve to overcome actual esophoria, as shown at the beginning of the test, will pass over into true esophoric appearances at the close of the work because in a state of repose, the third nerve stimuli to the internal recti must predominate. Again, in the case of esophoria due to overstimulation of the third nerve from hyperopia, the application of correcting plus lenses will gradually cause the muscle disturbance to disappear, and the patient can be instructed to state the relation of the test lines from time to time during a test, a thing never heretofore possible during a test, because all the older tests become intolerable after a very brief space of time.

In the illustrated form of the apparatus, it will be understood of course that the patient may wear the usual trial frame or a trial frame may be supported on the bar 3 along with the other parts of the apparatus as in any phoropter, phoro-optometer or similar apparatus. In place of a small test chart 1 supported in close proximity to the apertured plate 2, an illuminated distant chart may be employed with letters and clock dial similarly arranged. The lettering on such distant chart will be the same as on chart 1 where it is to be viewed directly or where on account of limited space available to the optometrist or oculist, a mirror is employed to reflect the chart to the patient, the type will of course be required to be reversed.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In a device for testing eyes, the combination of duplicate sets of test objects in diagonally located relation and means for causing opposite retinal halves of the respective eyes to view respective sets.

2. In an eye testing device, the combination of a test chart having duplicate test characters in diagonally opposite quarters, and a plate with sight holes, one for each eye and spaced apart vertically and horizontally.

3. In an eye testing device, the combination of a test chart divided into quarters and having duplicate sets of test characters in diagonally opposite fourths, and a plate adapted to be interposed between the eyes to be tested and the chart and having two spaced apertures so positioned as to allow each eye to receive one half of one set of test characters, the halves being opposite so that together they will form a true complete image if no muscular imbalance is present in the eyes.

4. In an eye testing device, the combination of a test chart divided into quarters and having duplicate sets of test characters in diagonally opposite fourths, and a plate adapted to be interposed between the eyes to be tested and the chart and having two spaced apertures of rectangular form, such apertures being spaced on opposite sides of both a horizontal and a vertical line and so positioned as to allow each eye to receive one half of one set of test characters, the halves being opposite so that together they will form a true complete image if no muscular imbalance is present in the eyes.

5. In an eye testing device, the combination of a holder, a test chart mounted on said holder, said chart being divided into fourths by a vertical and a horizontal line and being provided in diagonally opposite corners with duplicate sets of test characters, a plate mounted on said holder and movable relative to said chart and adapted to be positioned between the chart and the eyes to be tested, said plate having two spaced apertures of rectangular form, such apertures being spaced on opposite sides of both a horizontal and a vertical line and so positioned as to allow each eye to receive one half of one set of test characters, the halves being opposite so that together they will form a true complete image if no muscular imbalance is present in the eyes.

Signed by me this 12th day of March, 1925.

JOSEPH W. SMITH.